United States Patent [19]

Faber et al.

[11] Patent Number: 4,697,680
[45] Date of Patent: Oct. 6, 1987

[54] FLUID OPERATED DISCONNECT COUPLING

[75] Inventors: Joseph Faber, Carmel, Ind.; Paul Myers, Rockford, Ill.

[73] Assignee: Sundstrand Corporation, Rockford, Ill.

[21] Appl. No.: 870,802

[22] Filed: Jun. 5, 1986

[51] Int. Cl.⁴ ............................................. F16D 25/00
[52] U.S. Cl. ..................... 192/86; 192/85 C; 192/101; 192/114 R
[58] Field of Search ............. 192/67 R, 85 V, 85 CA, 192/86, 101, 114 R, 85 C; 70/275, DIG. 48; 292/144, 201

[56] References Cited

U.S. PATENT DOCUMENTS

| 979,530 | 12/1910 | McKee | 123/185 F |
|---|---|---|---|
| 1,323,007 | 11/1919 | Brunette | 160/290 R |
| 1,410,090 | 3/1922 | Wood | 192/67 R |
| 2,220,463 | 11/1940 | Sinclair | 192/67 R |
| 2,328,092 | 8/1943 | Nutt et al. | 192/3.63 |
| 2,784,822 | 3/1957 | Heiser | 192/86 |
| 3,425,527 | 2/1969 | Wolf | 192/48.6 |
| 3,610,004 | 10/1971 | Neese | 70/218 |
| 3,835,722 | 9/1974 | Bertram | 74/405 |
| 3,880,266 | 4/1975 | Sugahara | 192/86 |
| 3,972,398 | 8/1976 | Chamberlain | 192/4 A |
| 4,355,830 | 10/1982 | Rau, III | 292/144 |
| 4,426,915 | 1/1984 | Maucher et al. | 92/29 |
| 4,445,393 | 5/1984 | Braun | 74/346 |
| 4,478,320 | 10/1984 | Baba | 192/48.91 |
| 4,482,039 | 11/1984 | Harris | 192/67 R |
| 4,577,741 | 3/1986 | Schmid | 192/85 V |

FOREIGN PATENT DOCUMENTS 2540191 3/1977 Fed. Rep. of Germany ........ 192/85 CA

Primary Examiner—John E. Murtagh
Assistant Examiner—Andrew Joseph Rudy
Attorney, Agent, or Firm—Wood, Dalton, Phillips, Mason & Rowe

[57] ABSTRACT

Positive retention of a power train coupling in either a coupled or decoupled position is achieved in a structure including first and second power train elements 12 and 14 mounted for movement relative to each other between a coupled power transmitting position and a decoupled non-transmitting position by the provision of a pair of fluid operated latches 34 and 36 engageable with a double acting piston 28 and cylinder 26 which is operable to move one of the elements 12,14 relative to the other. Each latch includes a moveable latch element 48 for latchingly engaging a groove 30, 32 in the rod 24 mounting the pistion 28, a second fluid cylinder 38 for moving the latch element 48, and a valve 52, 54 for establishing fluid communication between the second cylinder 36 and the double acting cylinder 26.

8 Claims, 2 Drawing Figures

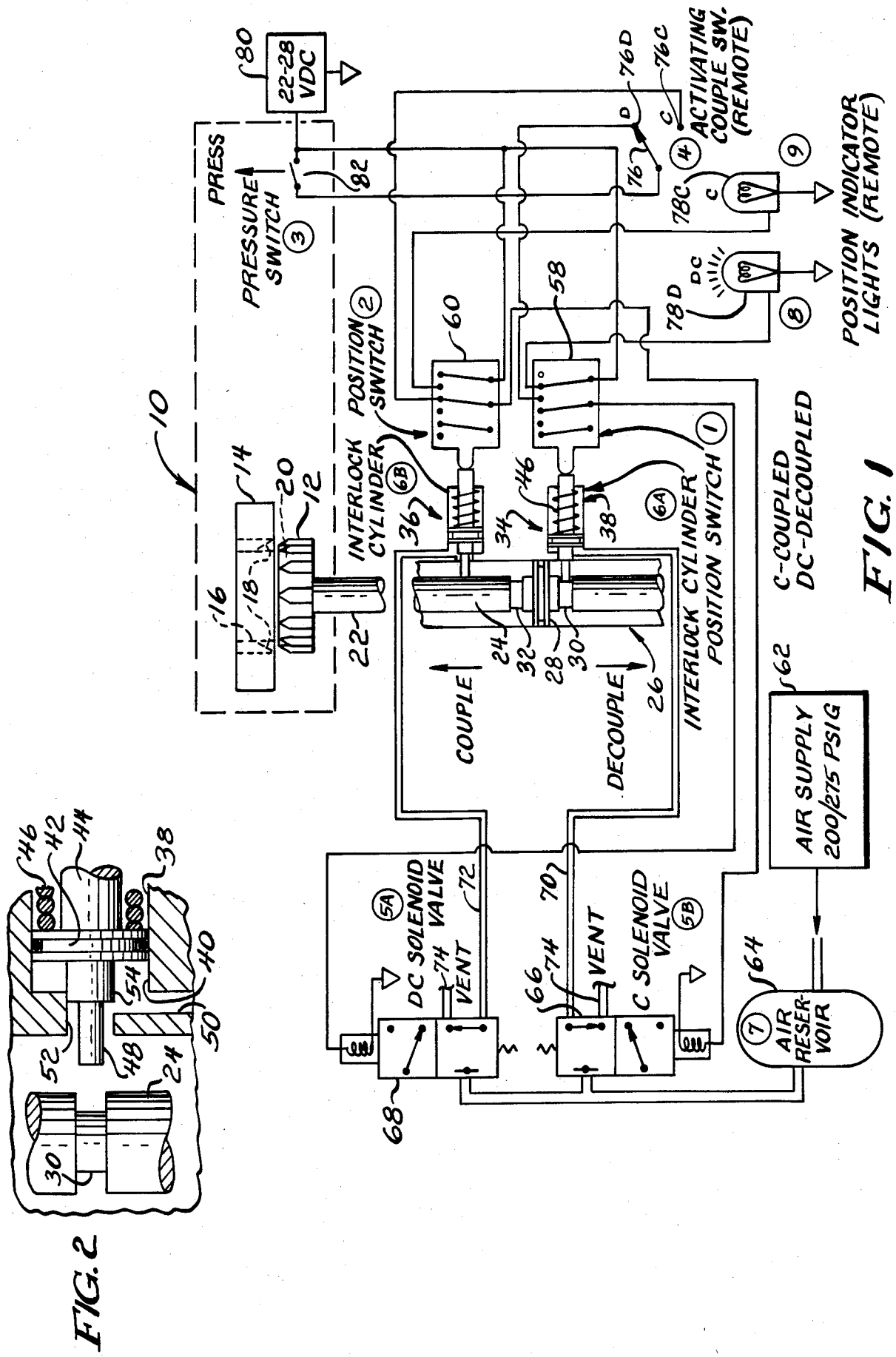

4,697,680

FLUID OPERATED DISCONNECT COUPLING

FIELD OF THE INVENTION

This invention relates to a fluid operated disconnect coupling, and more specifically, such a coupling that may be utilized for coupling or uncoupling a power takeoff shaft in a power train.

BACKGROUND OF THE INVENTION

A large number of power trains associated with, for example, motors or engines, include provision for operating auxiliary devices via a power take-off. Frequently, the power take-off is in the form of a shaft connected to the auxiliary devices.

Depending upon the system, any number of a large variety of reasons may exist that require occasional decoupling of the power take-off from the power train and a variety of proposals of coupling and decoupling mechanisms have been made. By way of example, attention may be directed to the following U.S. Pat. Nos. 2,784,822 issued Mar. 12, 1957 to Heiser; 3,835,722 issued Sept. 17, 1974 to Bertram, et al; and 4,482,039 issued Nov. 13, 1984 to Harris.

While such couplings may operate generally satisfactorily for their intended purpose, the same generally fail to provide for positive latching of the coupling in either the coupled or decoupled state. The failure to provide such means can result in operational difficulties in the case of system failures. For example, unintentional attempts to couple or decouple during operation of the power train may cause damage to the coupling and/or provide undesirably high loads elsewhere in the system.

The present invention is directed to overcoming the above problems.

SUMMARY OF THE INVENTION

It is the principle object of the invention to provide a new and improved fluid operated disconnect coupling. More particularly, it is an object of the invention to provide such a coupling wherein the coupling is positively maintained in either a coupled or an uncoupled state, as desired. Preferably, provision is made for positively, alternatively maintaining the coupling in both a coupled state and a decoupled state.

An exemplary embodiment of the invention achieves the foregoing objects in a structure including first and second power train elements mounted for movement relative to each other between a coupled, power transmitting position and a decoupled non-transmitting position. Means are connected to at least one of such elements for effecting the relative movement between the positions and include a first fluid cylinder. Fluid operated latch means are provided for latching the effecting means in at least one of the two positions and include a moveable latch for latchingly engaging or releasing the effecting means, a second fluid cylinder for moving the latch and a valve operable with the latch to establish fluid communication between the fluid cylinders when the moveable latch was released the effecting means. A control means is provided for selective directing fluid under pressure to the second cylinder.

As a consequence of this construction, the latching means will positively latch the movement effecting means in a desired one of the positions. When it is desired to shift to the other position, the control means provides fluid under pressure first to the second fluid cylinder to release the latch. When the latch is released, the establishment of fluid communication by the valve between the fluid cylinders results in the application of fluid under pressure to the first cylinder to provide the desired change in state.

In a preferred embodiment, the second cylinder is a spring loaded, single acting cylinder which operates to bias the latch into engagement with the effecting means.

The second cylinder may have a rod mounting the latch and the rod further defines part of the valve.

In a highly preferred embodiment, the second cylinder is mounted on the first cylinder and the latch enters the first cylinder for latching engagement with a piston rod therein. The valve includes a port into the first cylinder and the rod of the second cylinder extends through the port.

The invention contemplates the first cylinder be a double acting cylinder and that there be two of the latch means. One of the latch means latchingly engages the piston rod at the coupled position and the other latchingly engages the piston rod at the decoupled position. The control means is selectively operable to direct fluid under pressure to one or the other of the latch means. In a highly preferred embodiment, there is further included a means for detecting a condition indicative of the operation of one of the elements for disabling the effecting means. As a consequence, coupling or uncoupling is precluded from occurring during operation of a power train with which the mechanism may be associated.

Other objects and advantages will become apparent from the following specification taken in connection with the accompanying drawings.

DESCRIPTION OF THE DRAWINGS

FIG. 1 is a diagram of a coupling system made according to the invention with parts shown schematically; and FIG. 2 is an enlarged fragmentary view of a portion of a latching mechanism utilized in connection with the invention.

DESCRIPTION OF THE PREFERRED EMBODIMENT

An exemplary embodiment of the invention is illustrated in the drawing and with reference to FIG. 1 is seen in connection with a power train, shown schematically by the general designation 10, which may be, for example, the gear box on a turbine engine.

Within the power train 10 are first and second rotatable gears 12 and 14 journaled by conventional means (not shown). The gear 14 includes internal gear teeth 16 which are chamfered as shown at 18 at their ends facing the gear 12. The gear 12 has chamfered ends 20 and is axially moveable towards and away from the gear 14. When moved toward the gear 14, the chamfers 18 and 20 serve to align the gears 12 and 14 so that the gear 12 enters the gear 14 to engage the teeth 16. Thus, if the gear 14 is a drive gear within the power train 10, the gear 12 will be driven thereby when axially moved into coupling engagement therewith. To decouple the gears 12 and 14, the latter is moved axially away from the former to the position illustrated in FIG. 1.

The gear 12 is moved between coupled and uncoupled positions by one end 22 of a piston rod 24 of a double acting, double rod ended, fluid cylinder, generally designated 26.

Within the cylinder 26 the rod 24 mounts a piston 28 and annular grooves 30 and 32 are located in the rod 24 on each side of the piston 28.

As viewed in FIG. 1, when the lower side of the piston 28 is subjected to fluid under pressure, the gear 12 will be moved into engagement with the gear 14 as shown by the arrow bearing the legend "couple."

Conversely, when the upper side of the piston 28 is pressurized, the latter will move in the direction indicated by the arrow bearing the legend "decouple" to move the gear 12 out of engagement with the gear 14.

Latch means are provided for holding the rod 24 in either of two positions, one position corresponding to a coupled position of the gears 12 and 14 and the other position corresponding to a decoupled position of the gears 12 and 14. A first latch unit, generally designated 34, is operable to latch the rod 24 in a decoupled position while a second latch 36 is operable to latch the rod 24 in a position corresponding to a coupled position.

The latches 34 and 36 are identical structurally to each other so only the latch 34 will be described in detail. The same includes a single acting, spring biased cylinder, generally designated 38 which is mounted on the cylinder 26. The cylinder 38 includes an internal bore 40 reciprocally receiving a piston 42 on a rod 44. A spring 46 is located within the bore 40 and is operable to bias the piston 42 to the left as viewed in FIGS. 1 and 2.

The rod 44, at its end adjacent the rod 24, mounts a latch 48 which can enter the groove 30 of the rod 24 to mechanically latch the rod 24 against movement. In the usual case, the bias provided by the spring 46 is sufficient to cause introduction of the latch 48 into the groove 30.

A fluid port 50 opens to the bore 40 on the side of the piston 42 opposite the spring 46. By introducing fluid under pressure into the port 50, the piston 42 may be moved against the bias of the spring 46 to withdraw the latch 48 from the groove 30.

It will be observed that the rod 44 and the latch 48 enter the cylinder 26 via a port 52 in the wall thereof. The port 52 along with a shoulder 54 on the rod 44 act as a valve for controlling fluid communication between the bore 40 of the cylinder 38 and the interior of the cylinder 26 on the side of the piston 28 adjacent the groove 30. When the piston 42 is moved to its full left position as viewed in FIG. 2 under the influence of the biasing spring 46, it will be appreciated that the port 52 is sealed by the presence of the shoulder 54 therein. Consequently, there will be no fluid communication between the bore 40 and the cylinder 26 during such occurrence, which will always be the case so long as the latch 36 is partly or wholly within the groove 30.

The latch 36 operates in the same fashion but cooperates with the groove 32 and the associated side of the piston 28. The rods 44 of the latches 34 and 36 also operate respective electrical switches 58 and 60 of the multiple contact variety.

The system includes a supply of fluid under pressure shown schematically at 62 which provides, for example, pressurized air to a reservoir 64. The air reservoir 64 is connected in parallel to solenoid operated valves 66 and 68. The valves 66 and 68 are three-way valves and connect respective conduits 70 and 72 to the reservoir 64 when the associated solenoid is energized or to a vent 74 when the associated solenoid is de-energized.

The conduit 70 is connected to the port 50 associated with the first latch 34 while the conduit 72 is connected to the corresponding port associated with the second latch 36.

The system also includes an activating switch 76 which may be closed via a contact 76D to cause decoupling of the gears 12 and 14 or through a contact 76C to cause coupling of the gears 12 and 14. Wired into the circuit are indicator lights 78C to indicate coupling of the gears and 78D to indicate decoupling.

The system also includes a power source and a detecting switch in the form of a pressure switch 82 which is open when subjected to pressure. Typically, the pressure switch 82 will be located in the lubricant system of the power train 10, which, of course, will contain lubricant at an elevated pressure whenever the power train is operative. Conversely, when the power train is not operative, the lubricant system will be at ambient pressure and the switch 82 will close.

Operation of the system is as follows. As illustrated, the components are in a decoupled position. Assuming that the detecting switch 82 is closed, indicative of the fact that the system is not operative, the moving of the switch 76 to a closed position via the contact 76C will result in power being applied through the closed set of contacts of the switch 60 to the solenoid valve 66. The solenoid will be energized with the consequence that the air reservoir 64 will be connected to the line 70. Fluid under pressure will be applied to the left hand side of the piston 42 to move the same to the right against the bias of the spring 46. This will result in the latch 48 being withdrawn from the groove 30 freeing the rod 24 for movement toward the coupling position.

When the shoulder 54 clears the port 52, the lower side of the piston 28 will be in fluid communication with the interior of the bore 40 and the pressurized fluid therein will act against the piston 28 to move the same upwardly to cause engagement of the gear 12 with the gear 14. At this time the solenoid valve 68 will be de-energized since it can only be energized when the switch 76 is closed via the contact 76D. As a consequence, as the piston rod 24 moves up within the cylinder 26, the groove 32 will align with the latch associated with the latch 36 and the biasing spring 46 of the latch 36 will result in positive latching by entry into the groove 32 when the gears 12 and 14 are aligned and engaged. This, in turn, will cause the opening of the closed contact of the switch 60 de-energizing the solenoid valve 66. It will also cause the open contact of the switch 60 to be closed to illuminate the indicator light 78C indicating a coupled position.

Furthermore, the withdrawal of the latch 48 associated with the latching mechanism 34 from the groove 30 will change the condition of the contacts of the switch 58. The open contact will become closed thereby conditioning the circuit for operation to cause decoupling upon a change in the condition of the switch at 76. In addition, the closed contact of the switch 56 will have opened to de-energize the indicator light 78D.

A similar but opposite operation occurs in the system in switching from a coupled to a decoupled condition.

From the foregoing, it will be appreciated that the coupling system of the invention provides positive retention of the shiftable element responsible for coupling and uncoupling in either a coupled or a decoupled position, and then by mechanical latches unaffected by system failures as, for example, the loss of air pressure, sticky valves or the like. The unique arrangement of system components utilizes air under pressure only under a coupling or decoupling operation and constant air pressure is not required to maintain a coupled or a decoupled operation.

Stress on system components is further eliminated by the unique arrangement of the latches 34 and 36 with respect to the cylinder 26 and the valving function provided by the shoulders 54 with respect to the ports 52. Simply stated, unlatching of the mechanical latches must be effected before the piston 28 can be pressurized. Thus, stresses on the latches that could result from early pressurization of the pistion 28 are avoided.

We claim:

1. A fluid operated disconnect coupling comprising first and second power train elements mounted for movement relative to each other between a coupled, power transmitting position and a decoupled, nontransmitting position;
means connected to at least one of said elements for effecting said relative movement between said positions and comprising a first fluid cylinder;
fluid operated latch means for latching said effecting means in at least one of said two positions including first and second mating latch parts, said second latch part being carried by said effecting means and said first latch part being movable for latchingly engaging or releasing said effecting means by latchingly engaging or releasing said second latch part, a second fluid cylinder for moving said first latch part and a valve operable with said first latch part to establish fluid communication between said fluid cylinders when said first latch part has released said effecting means; and
control means for selectively directing fluid under pressure to said second cylinder.

2. The transmission of claim 1 wherein said second cylinder is a spring loaded, single acting cylinder biasing said first latch part into engagement with said effecting means.

3. The transmission of claim 2 wherein said second cylinder has a rod mounting said first latch part, said rod further defining part of said valve.

4. The transmission of claim 3 wherein said second cylinder is mounted on said first cylinder and said first latch part enters said first cylinder for latching engagement with said second latch part on a piston rod therein; and said valve includes a port into said first cylinder, the rod of said second cylinder extendng through said port.

5. The transmission of claim 4 wherein said first cylinder is a double acting cylinder and there are two of said latch means, one for latchingly engaging said piston rod at said coupled position and the other for latchingly engaging said piston rod at said decoupled position; and said control means is selectively operable to direct fluid under pressure to one or the other of said latch means.

6. The transmission of claim 1 further including means for detecting a condition indicative of operation of one of said elements for disabling said affecting means 7. A fluid operated disconnect coupling comprising
first and second gears mounted for axial movement relative to each other between a coupled, power transmitting position; and a decoupled, nontransmitting position
means mounting one of said gears for relative axial movement between said position and comprising a double acting, double rod ended fluid cylinder, one of said rod ends mounting said one gear;
a pair of fluid operated latch means for latching said rod in a given one of said two positions each including a movable latch for latchingly engaging or releasing said rod adjacent a respective rod end thereof, a second fluid cylinder for moving said latch and a valve operable with the latch to establish fluid communication between a corresponding one of said second fluid cylinders and an associated side of said double acting cylinder when the corresponding movable latch has released said rods and
control means for selectively directing fluid under pressure to either of said second cylinders.

8. A fluid operated disconnect coupling comprising
first and second power train elements mounted for movement relative to each other between a coupled, power transmitting position and a decoupled, nontransmitting position;
means connected to at least one of said elements for effecting said relative movement between said positions and comprising a double acting fluid cylinder;
a pair of fluid operated latch means, one for latching said effecting means in an associated one of said two positions, each including a movable latch for latchingly engaging or releasing said effecting means, a second fluid cylinder for moving said latch and a valve operable with the latch to establish fluid communication between said second fluid cylinder and a given side of said double acting cylinder when said movable latch has released said effecting means; and
control means for selectively directing fluid under pressure to either one of said second cylinders.

* * * * *